(12) United States Patent
Lee

(10) Patent No.: US 8,739,759 B2
(45) Date of Patent: Jun. 3, 2014

(54) POWER TRANSMISSION SYSTEM OF CRANK STRUCTURE

(75) Inventor: Young Hee Lee, Yongin (KR)

(73) Assignee: Young Hee Lee, Yongin-si, Gyeonggi-do (KR)

( * ) Notice: Subject to any disclaimer, the term of this patent is extended or adjusted under 35 U.S.C. 154(b) by 0 days.

(21) Appl. No.: 13/576,387

(22) PCT Filed: Feb. 10, 2011

(86) PCT No.: PCT/KR2011/000888
§ 371 (c)(1),
(2), (4) Date: Jul. 31, 2012

(87) PCT Pub. No.: WO2011/105707
PCT Pub. Date: Sep. 1, 2011

(65) Prior Publication Data
US 2012/0318087 A1      Dec. 20, 2012

(30) Foreign Application Priority Data

Feb. 25, 2010    (KR) .................. 10-2010-0016908

(51) Int. Cl.
*F02B 75/32* (2006.01)
(52) U.S. Cl.
USPC .............. 123/197.4; 123/197.1; 74/413
(58) Field of Classification Search
USPC ............. 123/197.1, 197.2, 197.3, 197.4, 3; 74/412, 413, 414, 393, 437, 7 B, 7 E
See application file for complete search history.

(56) References Cited

U.S. PATENT DOCUMENTS

| 3,301,244 A | * | 1/1967 | Renshaw | 123/197.1 |
| 5,111,707 A | * | 5/1992 | Sugiyama | 74/7 E |
| 7,926,461 B2 | * | 4/2011 | Dirker | 123/190.1 |
| 2006/0225690 A1 | * | 10/2006 | Arov | 123/198 F |

FOREIGN PATENT DOCUMENTS

| JP | 2005106071 A | * | 4/2005 |
| JP | 2005291103 A | * | 10/2005 |
| KR | 10-2002-0071676 | | 9/2002 |

OTHER PUBLICATIONS

International Search Report mailed Oct. 28, 2011 for PCT/KR2011/000888.

* cited by examiner

*Primary Examiner* — Noah Kamen
*Assistant Examiner* — Long T Tran
(74) *Attorney, Agent, or Firm* — Lowe Hauptman & Ham, LLP

(57) ABSTRACT

A crank arm of a internal combustion engine is replaced by an elliptical gear 3 and another elliptical gear 4 having the same size and shape is assembled to engage and rotate such that the positions moved by a predetermined distance along the major axes of ellipses from centers 8 and 9 of the ellipses become rotation centers 5 and 7 of the elliptical gears 3 and 4 to alternately change the distances from the rotation centers of the engaged elliptical gears to a power transmission point 6 in accordance with the direction of power transmission. The present invention provides a power transmission assembly for improve on fuel efficiency of a internal combustion engine that makes it possible to improve acceleration force and hill climbing ability by generating larger torque and to generate large effective power by reducing the loss of power.

6 Claims, 3 Drawing Sheets

POWER TRANSMISSION SYSTEM OF CRANK STRUCTURE

CROSS REFERENCE TO RELATED APPLICATION

This application claims the priority of Korean Patent Application No. 10-2010-0016908, filed on Feb. 25, 2010 in the KIPO (Korean Intellectual Property Office). Further, this application is the National Phase application of International Application No. PCT/KR2011/000888 filed Feb. 10, 2011, which designates the United States and was filed in Korean.

BACKGROUND OF THE INVENTION

1. Field of the Invention

The present invention relates to a power transmission assembly for improve on fuel efficiency of a internal combustion engine by improving the power transmission assembly of a internal combustion engine, which generates driving force by converting the reciprocating motion of a piston into rotating motion of a crankshaft, in order to generate larger torque in an internal combustion engine with the same displacement such that acceleration and hill climbing abilities are improved and larger effective power (indicated horsepower) is generated.

2. Description of the Related Art

Four cycle internal combustion engines are apparatuses that reciprocate pistons by sequentially repeating four strokes of intake, compression, power, and exhaust and convert the reciprocating motion of the pistons into rotating motion of a crankshaft using connecting rods that connect the pistons with a crank arm to generate torque. Only the power generated by the power stroke of the four strokes in the internal combustion engines generates torque and the other strokes (intake, compression, and exhaust) except for the power stroke are performed by receiving power from the torque generated by the power strokes of other pistons or moment of inertia of the flywheel.

Therefore, the four cycle internal combustion engines generate power for engine power during the power stroke, but consume the power generated by other pistons during the other strokes (intake, compression, and exhaust) except for the power stroke.

That is, the power of the pistons is transmitted to be converted into torque of the crankshaft during the power stroke of the four cycle internal combustion engines, but the direction of power transmission changes such that the torque of the crankshaft is converted into power for keeping the strokes of the pistons progressed, during the other strokes (intake, compression, and exhaust) except for the power stroke.

SUMMARY OF THE INVENTION

In gasoline engines, only 25 to 30% of the energy generated by a power stroke is converted into effective power for engine power and the other energy of 70 to 75% is lost. Therefore, the present invention has been made in an effort to improve acceleration force and hill climbing ability by increasing torque that can be generated by a internal combustion engine and consequently improve effective output to the fuel consumption amount of the internal combustion engine, that is, the fuel efficiency by increasing effective power (indicated horsepower), by improving the power transmission assembly such that piston power generated by a power stroke is converted into large torque and power for compression and exhaust strokes in which the direction of power transmission changes is converted from smaller torque in the internal combustion engine.

A crank arm of a internal combustion engine is replaced by an elliptical gear 3, as shown in FIG. 2, and another elliptical gear 4 having the same size is assembled to engage and rotate such that the positions moved by a predetermined distance along the major axes of ellipses from centers 8 and 9 of the ellipses become rotation centers 5 and 7 of the elliptical gears 3 and 4, as shown in FIG. 2, to alternately change the distances from the rotation centers 5 and 7 of the elliptical gears 3 and 4 to a power transmission point 6 in accordance with the direction of power transmission.

Accordingly, while a piston is moved from the TDC to the BDC by a power stroke in the internal combustion engine, the distance from the rotation center of the elliptical gear 3 replacing the crank arm to the power transmission point 6 decreases and the distance from the rotation center 7 of the elliptical gear 4 engaging and rotating with the gear 3 to the power transmission point 6 increases, so that piston power is converted into larger toque. Further, while the piston is moved from the BDC to the TDC by an intake stroke and an exhaust stroke in the four internal combustion engine, the distance from the rotation center 5 of the elliptical gear 3 replacing the crank arm to the power transmission point 6 increases and the distance from the rotation center 7 of the elliptical gear 4 engaging and rotating with the gear 3 to the power transmission point 6 decreases, so that power for the strokes of the piston is generated from smaller torque.

In this configuration, the crankshaft rotates at different speeds in accordance with the motion position of the piston, so that the elliptical gears 3 replacing the crank arm is fixed to rotate at different speeds for each piston and the elliptical gears 4 engaging and rotating with the elliptical gears 3 replacing the crank arm are integrally assembled to rotate at the same speed with the rotary shaft.

When the torque of the crankshaft converted from piston power is the same, the maximum torque generated at the elliptical gear 4 by the improved power transmission assembly is generated when the stroke of the piston is in the state shown in FIG. 2, in which the magnitude of the transmitted torque changes in accordance with the ratio between the distance from the rotation center 5 of the elliptical gear 3 replacing the crank arm to the power transmission point 6 and the distance from the rotation center 7 of the elliptical gear 4 engaging and rotating with the gear 3 to the power transmission point 6.

For example, referring to FIGS. 3 and 4 in which the improved power transmission assembly is applied to an 8-cylidner internal combustion engine, the ratio between the distance from the rotation center 5 of the elliptical gear 3 replacing the crank arm to the power transmission point 6 and the distance from the rotation center 7 of the elliptical gear 4 engaging and rotating with the gear 3 to the power transmission point 6 is 1:2.4142165.

Further, the furthermost from the rotation center 5 along the major axis of the elliptical gear 3 replacing a crank arm is determined as the coupling point 10 of the lower end of the connecting rod, as shown in FIG. 2, in which the ratio between the distance from the rotation center 5 of the elliptical gear 3 replacing the crank arm to the power transmission point 6 and the distance from the rotation center 5 to the point 10 of the lower end of the connecting rod is 1.902084.

Therefore, the maximum torque generated by the power stroke in the improved internal combustion engine increases by 2.4142165 times (1.902084F×1.2692481L) the maximum torque generated by the power stroke in an existing internal combustion engine.

However, since the piston stroke cycle is adjusted such that the cycle of torque generation by the power stroke is uniformly distributed while the crankshaft rotates by 720 degrees in a four cycle internal combustion engine with four or more cylinders, the maximum torque generated by the power stroke in an existing 8-cylinder four cycle internal combustion engine is generated when power strokes are simultaneously performed in two pistons, so that it can be inferred that the maximum torque is double the maximum torque converted from power of one piston.

Therefore, it can be inferred that the maximum torque generated by the power stroke in an 8-cylinder four cycle internal combustion engine with an improved power transmission assembly is 1.20710825 times (2.4142165÷2) the maximum torque generated by the power stroke in an existing 8-cylinder four cycle internal combustion engine.

Therefore, it is possible to generate larger maximum torque in an 8-cylinder internal combustion engine with an improved power transmission assembly and the acceleration force and hill climbing ability is increased, with the generation of large maximum torque. Further, it is possible to generate larger effective power (indicated horsepower) by generating larger torque from energy generated by the power stroke in a internal combustion engine and generating piston power for the compression and exhaust strokes from smaller torque to reduce the loss of power.

DETAILED DESCRIPTION OF THE PREFERRED EMBODIMENTS

Figure 1:
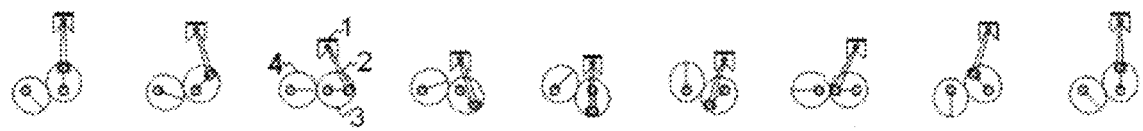
FIG. 1 is a view illustrating the operation of an improved power transmission assembly (where the up-down movement of a piston during strokes in a four cycle internal combustion engine and the process of rotating of elliptical gears engaging with each other by 360 degrees in accordance with the positions of the piston, are shown for each 45 degrees).
Figure 2:
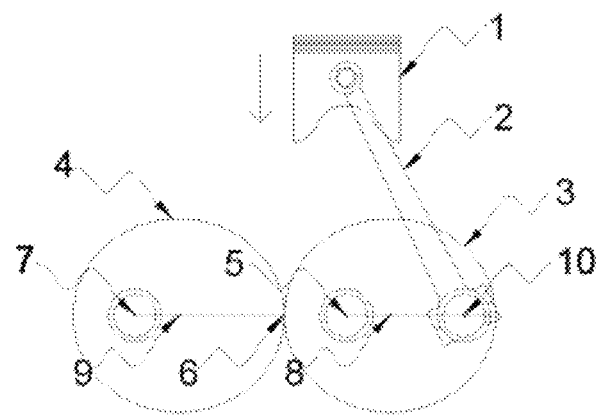
FIG. 2 is a reference view for assembling the elliptical gears in the improved power transmission assembly, which shows a method of coupling two elliptical gears and the lower end of a connecting rod for maximizing generation of torque in accordance with power generation and transmission direction of a internal combustion engine (where the major axis of the elliptical gear 4, which engages with an elliptical gear 3 replacing the crank arm, and the coupling point of the lower end of the connecting rod should be on the same line when the piston is positioned at the middle point in the range of up-down movement).

A crank arm that is coupled to a connecting rod connected to a piston of a internal combustion engine and rotates a crankshaft is replaced by an elliptical gear 3 and another elliptical gear 4 having the same size and shape is assembled to engage and rotate such that the major axes of the elliptical gears 3 and 4 are on a horizontal line when the piston is positioned at the middle point in the range of up-down motion and the shapes of the ellipses are the same, as shown in FIG. 2.

Further, the elliptical gears 3 replacing the crank arm should be rotatably fixed by separating the crankshaft for each piston such that the gears rotate at different speeds, and the other elliptical gears 4 engaging and rotating with the gear 3 should be integrally fitted on a rotary shaft to rotate at the same speed, in which torque of the rotary shaft is effective power (indicated horsepower) of the internal combustion engine.

In the power transmission assembly, the crankshaft rotates by 180 degrees while the piston moves from the TDC (top dead center) to the BDC (bottom dead center), but the driven gear 4 receiving torque from the crankshaft rotates smaller than 180 degrees, so that the internal combustion engine should be equipped with at least five or more pistons to maintain power generated by power strokes of the internal combustion engine.

Figure 3:
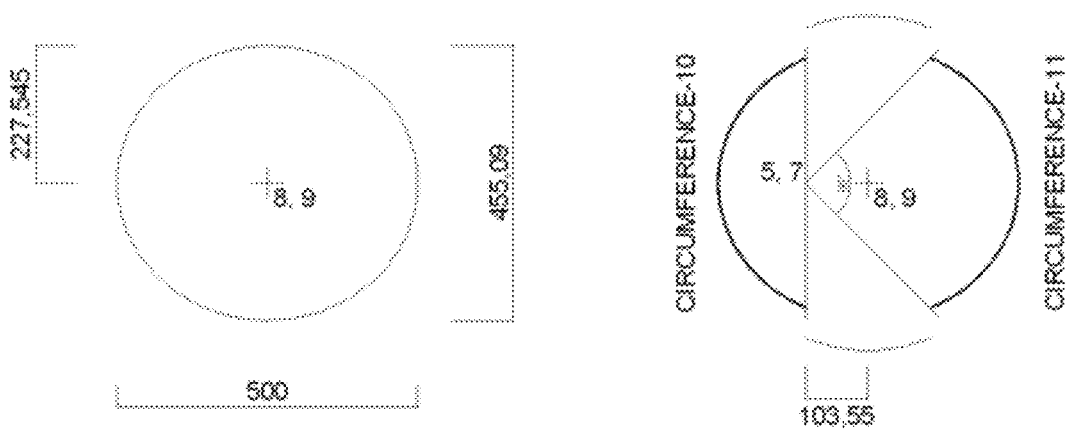
FIG. 3 is a view illustrating a method of determining a rotation center of an elliptical gear (where rotation centers 5 and 7 where the circumference 10 and the circumference 11 coincide are determined, while moving a position along the major axis of the ellipse).
Figure 4:
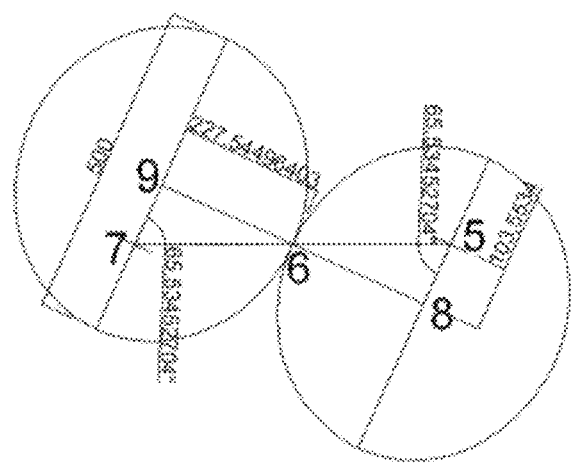
FIG. 4 is a view illustrating a method of determining the shape of an elliptical gear (where the lengths of the minor axes of two ellipses are determined such that the ellipses of two elliptical gears 3 and 4 come in contact with each other at the intersection of the line connecting the centers of the ellipses 8 and 9 and the line connecting the rotation centers 5 and 7 in order to smoothly engage and rotate the elliptical gears 3 and 4).
Figure 5:
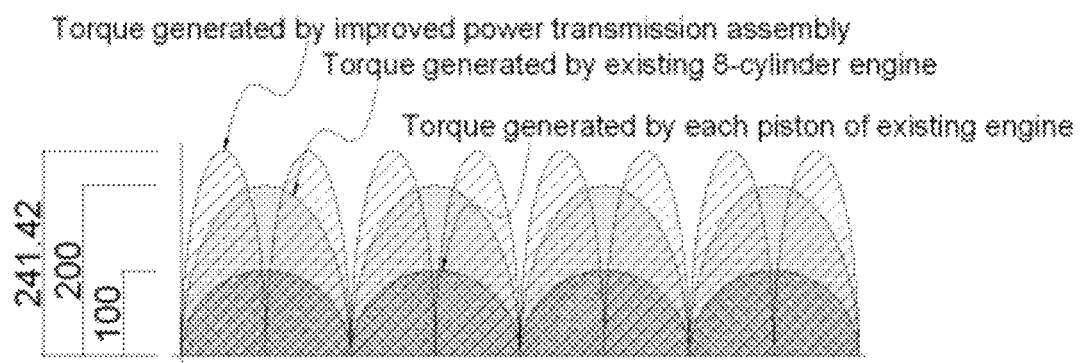
FIG. 5 is a view showing the cycles of torque generation of existing and improved 8-cylinder four cycle internal combustion engines (where the magnitude of torque generated by a power stroke of the 8-cylinder four cycle internal combustion engines is shown for each of a piston of the existing engine, an existing 8-cylinder engine, and an improved power transmission assembly, per each stroke cycle in the table).

Therefore, the minimum rotation angle (720 degrees/the number of pistons) of the driven gear 4 is determined while the crankshaft and the driving gear 3 rotate by 180 degrees in accordance with the number of pistons of the internal combustion engine, the eccentric distance from the center of the ellipses 8 and 9 to the rotation centers 5 and 7 of the gears is determined in accordance with the determined minimum rotation angle of the gear 4, the ratios of the lengths of the major axes and the minor axes of the ellipses are determined such that the two elliptical gears 3 and 4 can smoothly engage and rotate about the eccentric rotation centers 5 and 7 by the methods shown in FIGS. 3 and 4, thereby determining the shapes of the elliptical gears 3 and 4.

A crank arm that is coupled to a connecting rod connected to a piston of a internal combustion engine and rotates a crankshaft is replaced by an elliptical gear 3 and another elliptical gear 4 having the same size and shape is assembled to engage and rotate such that the elliptical gears 3 and 4 can transmit power there between while engaging and rotating about an eccentric center moved by a predetermined distance along the major axes of the ellipses from the centers of the ellipses, in which the elliptical gears 3 and 4 are assembled such that the major axes of the ellipses should be on a horizontal line when the piston is positioned at the middle point in the range of up-down motion and the shapes of the ellipses should be the same, as shown in FIG. 2.

Further, the elliptical gears 3 coupled to the crankshaft should be rotatably fixed by separating the crankshaft for each piston such that the gears rotate at different speeds, and the other elliptical gears 4 engaging and rotating with the gear 3 should be integrally fitted on a rotary shaft to rotate at the same speed, in which torque of the rotary shaft is effective power (indicated horsepower) of the internal combustion engine.

Since the minimum rotation angle of the driven gear 4 receiving power while the crankshaft and the driving gear 3 rotate by 180 degrees in the improved power transmission assembly of an 8-cylinder internal combustion engine should be 90 degrees, which is ⅛ of 720, or more, the points where the circumference 10 and the circumference 11 shown in FIG. 3 become the same by moving along the major axes of the ellipses by 0.2071068 times the lengths of the major axes from the centers 8 and 9 of the ellipses should be the rotation centers 5 and 7 of the elliptical gears, the lengths of the minor axes of the ellipses are determined such that the circumferences of the ellipses come in contact with each other at the intersection of the line connecting the centers 8 and 9 of the elliptical gears and the line connecting the rotation centers 5 and 7, by the method shown in FIG. 4. When the lengths of the minor axes of the ellipses are adjusted by the method shown in FIG. 4, the eccentric distance of the rotation centers determined by the method shown in FIG. 3 should be adjusted again, so that the lengths of the minor axes of the elliptical gears should be adjusted by alternately applying the methods shown in FIGS. 3 and 4, and the shape of the elliptical gear that is applied to the improved power transmission assembly of the 8-cylinder internal combustion engine are determined such that the ratio of the minor axis and the major axis becomes 1:1.09868395051.

According to the present invention, it is possible to improve fuel efficiency and effective power of the engines of vehicles and ships, and to improve the power and fuel efficiency even in industrial machinery that use internal combustion engines as power generator, such as an industrial power generator.

What is claimed is:

1. A power transmission system, the power transmission system comprising:
   a first elliptical gear fixed to a crankshaft and having an eccentric rotational center at a predetermined distance from an ellipse center of the first elliptical gear; and
   a second elliptical gear having an eccentric rotational center at a predetermined distance from an ellipse center of the second elliptical gear, and engaging and rotating with the first elliptical gear, the second elliptical gear having the same size as the first elliptical gear,
   wherein the rotational centers are eccentrically positioned at the predetermined distances from the respective ellipse centers so that the first elliptical gear and the second elliptical gear are in contact with each other at a power transmission contact point where a first line, which connects the ellipse center of the first elliptical gear with the ellipse center of the second elliptical gear, and a second line, which connects the rotational center of the first elliptical gear with the rotational center of the second elliptical gear, cross each other.

2. The power transmission system of claim 1, wherein the first line and the second line make one straight line at each 180 degrees of a rotational cycle of the first elliptical gear.

3. The power transmission system of claim 1, wherein a first distance from the rotational center of the first elliptical gear to the power transmission contact point becomes shorter than a second distance from the rotational center of the second elliptical gear to the power transmission contact point, when power of the first elliptical gear provided from the crankshaft is transmitted to the second elliptical gear.

4. The power transmission system of claim 3, wherein the first distance from the rotational center of the first elliptical gear to the power transmission contact point becomes greater than the second distance from the rotational center of the second elliptical gear to the power transmission contact point, when power is transmitted from the second elliptical gear to the first elliptical gear.

5. A power transmission system, the power transmission system comprising:
   a first elliptical gear fixed to a crankshaft and having an eccentric rotational center at a predetermined distance from an ellipse center of the first elliptical gear; and
   a second elliptical gear having an eccentric rotational center at a predetermined distance from an ellipse center of the second elliptical gear, and engaging and rotating with the first elliptical gear,
   wherein the rotational centers are eccentrically positioned at the predetermined distances from the respective ellipse centers so that a first distance from the rotational center of the first elliptical gear to a power transmission contact point where the first elliptical gear and the second elliptical gear are in contact with each other becomes shorter than a second distance from the rotational center of the second elliptical gear to the power transmission contact point, when power of the first elliptical gear provided from the crankshaft is transmitted to the second elliptical gear.

6. The power transmission system of claim 5, wherein the first distance from the rotational center of the first elliptical gear to the power transmission contact point becomes greater than the second distance from the rotational center of the second elliptical gear to the power transmission contact point, when power is transmitted from the second elliptical gear to the first elliptical gear.

* * * * *